United States Patent
Krabbenborg et al.

(10) Patent No.: US 7,271,202 B2
(45) Date of Patent: Sep. 18, 2007

(54) REACTIVE HOT MELT ADHESIVE

(75) Inventors: Franciscus J. T. Krabbenborg, Terneuzen (NL); Marc A. Mangnus, Clinge (NL); Philippe C. Belot, Lachen (CH); Josiane Leon, Thiers sur Theve (FR)

(73) Assignee: Dow Global Technologies Inc., Midland, MI (US)

( * ) Notice: Subject to any disclaimer, the term of this patent is extended or adjusted under 35 U.S.C. 154(b) by 203 days.

(21) Appl. No.: 10/784,406

(22) Filed: Feb. 23, 2004

(65) Prior Publication Data

US 2004/0260012 A1    Dec. 23, 2004

(30) Foreign Application Priority Data

Feb. 25, 2003    (GB) ................. 0304276.9

(51) Int. Cl.
*C08J 3/12*     (2006.01)
*C08L 23/08*    (2006.01)
*C08K 5/00*     (2006.01)

(52) U.S. Cl. .................. 521/56; 521/94; 521/95; 521/96; 521/142; 521/149; 521/134; 521/138

(58) Field of Classification Search .......... 521/56, 521/94, 95, 96, 134, 138, 142, 149
See application file for complete search history.

(56) References Cited

U.S. PATENT DOCUMENTS

| | | | |
|---|---|---|---|
| 3,211,804 A | 10/1965 | Baum et al. ................ 260/848 |
| 3,267,083 A | 8/1966 | Imhof ........................ 260/80.5 |
| 3,663,334 A | 5/1972 | Mueller-Tamm et al. ... 156/309 |
| 3,700,758 A * | 10/1972 | Johnson et al. ............. 524/303 |
| 3,945,877 A | 3/1976 | Marcozzi ..................... 156/332 |
| 3,980,735 A | 9/1976 | Kosaka et al. .............. 260/873 |
| 4,480,054 A * | 10/1984 | Enderle ..................... 521/84.1 |
| 4,511,627 A | 4/1985 | Tanuma et al. ............. 428/429 |
| 6,634,698 B2 | 10/2003 | Kleino ..................... 296/146.6 |
| 2003/0162882 A1 | 8/2003 | Grimm et al. .............. 524/493 |
| 2004/0143034 A1 | 7/2004 | Primke et al. .............. 523/176 |

FOREIGN PATENT DOCUMENTS

| | | |
|---|---|---|
| EP | 0921530 | 6/1999 |
| GB | 853640 | 11/1960 |
| GB | 929365 | 6/1963 |
| GB | 1299480 | 12/1972 |

* cited by examiner

*Primary Examiner*—Irina S Zemel

(57) ABSTRACT

The invention is a reactive hot melt composition which has excellent adhesion and curing properties, and can be formulated into free-flowing pellets or beads, by using an ethylene-acrylic acid copolymer, and athylene-methacrylic acid copolymer, and/or an ethylene-acrylic acid methacrylic acid terpolymer as a component of the composition along with free radical crosslinking initiators. The incorporation of a foaming agent enables the production of compositions which are useful in space-filling applications, (i.e., as so-called "anti-flutter" compositions).

35 Claims, No Drawings

REACTIVE HOT MELT ADHESIVE

FIELD OF THE INVENTION

This invention relates to adhesive compositions, and in particular to compositions of the type able to form an initial bond between the parts to be bonded such that the parts can be handled after the initial bonding process, and which subsequently form a permanent bond by a reactive curing process. Such adhesives are generally known as reactive hot melt adhesives (RHMAs).

BACKGROUND OF INVENTION

This invention relates primarily to compositions for use as "anti-flutter compositions". In the automotive industry, RHMAs may find application, for example as so called "anti-flutter" compositions, (i.e., to fill the space between the reinforcing structure of a vehicle part and the outer skin panels in order to lessen vibration), and as "sealer" adhesives for use in an automotive body shop or paint-shop (for example, to protect weld-points or flange/gaps from corrosive attacks and humidity, water, dust particles intrusion). They may also be used for other applications, for example to bond two metal or plastics substrates and/or to increase damping or stiffening. Currently, these functions are fulfilled by compositions with paste-like consistency, with a range of viscosity depending on the application. Generally, existing reactive compositions are based on rubber, PVC, or acrylics. For use in body-shops in the automotive industry, where parts can be oily, these compositions need to have enough viscosity/strength after application in order to withstand the panel degreasing and pre-treatment process (so called wash-off resistance to dipping and jet-spray of water/alkaline/dispersion solutions). This requirement for high viscosity limits the rate at which material can be supplied pumped to the application nozzle. Generally the tube length to the nozzle cannot exceed about 10 to about 15 meters. Since a single adhesive may be needed to be applied at several locations spread over hundreds of meters in an automotive plant, a specific dispensing system (pump and associated room area, equipment, drum storage and logistics) need to be installed for each location. Furthermore, even this high viscosity level is often not sufficient to guarantee resistance to wash-off in critical areas of the body, does not give enough green strength, and can not prevent de-localisation of the adhesive during the body-shop process if the part is compressed. A post-application curing to eliminate the above mentioned issues would affect the cycle time, space requirement, and quality of the parts produced. It would be desirable to provide materials which do not have the handling difficulties of viscous liquid compositions, but give good wash-off and squeeze resistance, for example by providing a hot melt adhesive in the form of pellets. Non-reactive hot melt adhesives (so-called "HMA"s) could be used for such applications. HMAs do not have a reactive curing step and accordingly will deform and lose adhesion when heated above their melting point after application. HMAs in general use are commonly based on EVA. U.S. Pat. No. 3,980,735 discloses a HMA comprising an ethylene-vinyl acetate (EVA) copolymer, an unsaturated alkyd resin and an organic peroxide which, according to the description in the patent, can be formulated into pellets and powders. The adhesive composition is not a reactive one however, because the peroxide is substantially fully reacted with the EVA copolymer during the formulation of the adhesive. RHMAs have been available since the 1980s. Because they are capable of curing to a thermosetting material, RHMAs eliminates or reduce many of the problems associated with conventional HMAs, such as poor heat resistance, and water or solvent permeation. The most common RHMAs are based on polyurethanes and are cured using water. There are also several other types of RHMA which are based on non-polyurethane moisture curable polymers or on polymers which are cured by reactive UV curing processes. WO-A-0172922 discloses thermoplastic polymer particle batches which are only homogenised immediately before use. They are applied immediately after they are homogenised, because after homogenisation, the reaction is initiated and the batches only have a limited pot life. WO-A-02090454 discloses granulated adhesive based on polyols and isocyanates which are mixed while excluding moisture. Both WO-A-01712922 and WO-A-02090454 rely on moisture as a curing mechanism which limits their pot life. GB-A-1299480 discloses a process for making joining tapes, using a hot melt adhesive containing solid particles of a tack resin, an ethylene copolymer, and a peroxide. U.S. Pat. No. 3,945,877 discloses adhesive compositions consisting of coal tar pitch, ethylene acrylic acid, ethylene vinyl acetate and a crosslinking agent (peroxide) for adhering surfaces.

RHMAs have been introduced, which are cured by the use of a free radical initiator such as a peroxide. RHMAs of this type comprising ethylene vinyl acetate (EVA) copolymers are now in use in the automotive industry. They are supplied in the form of a viscous fluid composition or a pasty composition which can be pumped into a dispensing gun for application. Examples of this type of RHMA include BETA-GUARD™ supplied sealer compositions by The Dow Chemical Company. Such compositions often require the use of zinc acrylates as an adhesion promoter for metal which is undesirable because of Environmental, and Health and Safety concerns. Radical-initiated RHMAs generally have improved dimensional stability and strength and less tendency to sag, as well as better adhesion and corrosion resistance when heated to temperatures above their application temperature, as compared with other types of hot melt adhesive. One difficulty with viscous fluid compositions of this kind however is that the systems which are used for their dispensation and application are sensitive to the Theological properties of the compositions, which in turn depend on the temperature settings of the application equipment. The application equipment must therefore be set up differently for compositions with different Theological properties. This makes it difficult to deal with changes of formulation. In addition, viscous liquid RHMAs must be stored in small drums and processed with pumps through tubes and hoses for use. This produces large amounts of waste and high recycling costs.

It would be desirable to provide RHMA materials which do not have the handling difficulties of viscous liquid compositions, for example, by providing the RHMA in the form of pellets. In practice, however, pellets produced from RHMA compositions tend to be tacky and/or to have insufficient adhesion during initial application, particularly when applied to metal sheets under oily conditions, such as are typically encountered on a vehicle assembly line.

SUMMARY OF INVENTION

We have now discovered that a reactive hot melt composition can be prepared which has excellent adhesion and curing properties, and can be formulated into free-flowing pellets or beads, by using an ethylene-acrylic acid copolymer, an ethylene-methacrylic acid copolymer, and/or an ethylene-acrylic acid-methacrylic acid terpolymer as a component of the composition. The incorporation of a foaming agent enables the production of compositions which are useful in space-filling applications, (i.e., as so-called "anti-flutter" compositions).

According to a first aspect of the invention, there is provided a reactive hot melt composition in the form of free-flowing pellets, the composition comprising: a cross-linkable resin including at least one copolymer of ethylene with an ethylenically unsaturated monomer, the resin including one or more of an ethylene-acrylic acid copolymer, an ethylene-methacrylic acid copolymer, and an ethylene-acrylic acid-methacrylic acid terpolymer; a free radical cross-linking initiator having a 1 hour half-life temperature of from about 110 to about 170° C.; and a foaming agent. The compositions are suitable for use as an anti-flutter composition.

The said resin preferably constitutes from about 37 to about 60 percent based on the total weight of the composition, and the composition may preferably also comprise from about 10 to about 30 percent based on the total weight of the composition, of an adhesion promoter for providing adhesive properties to the composition at temperatures of from about 50 to about 100° C., wherein the adhesion promoter comprises at least one of a plasticizer and a tackifier. The composition also preferably comprises from about 10 to about 40 percent based on the total weight of the composition, of a filler.

According to a preferred aspect of the invention, there is provided a reactive hot melt composition in the form of free-flowing pellets, the composition comprising:

a) from about 37 to about 60 percent based on the total weight of the composition of a cross-linkable resin including at least one copolymer of ethylene with an ethylenically unsaturated monomer;

b) from about 10 to about 30 percent based on the total weight of the composition of an adhesion promoter for providing adhesive properties to the composition at temperatures of from about 50 to about 100° C., wherein the adhesion promoter comprises at least one of a plasticizer and a tackifier;

c) from about 0.5 to about 3 percent based on the total weight of the composition of a free radical cross-linking initiator having a 1 hour half-life temperature of from about 110 to about 170° C.; and d) from about 10 to about 40 percent based on the total weight of the composition of a filler; wherein component a) includes one or more of an ethylene-acrylic acid copolymer, an ethylene-methacrylic acid copolymer, and an ethylene-acrylic acid-methacrylic acid terpolymer, and e) from about 0.1 to about 4 percent based on the total weight of the composition of a foaming agent.

Compositions of the above type, comprising ethylene-acrylic acid copolymers, ethylene-methacrylic acid copolymers, and/or ethylene-acrylic acid-methacrylic acid terpolymers have been found to have good initial adhesion properties to steel, particularly oily steel, whilst being capable of formulation into pellets which can be conveniently handled. They can be easily melted and applied, using conventional extrusion apparatus.

The compositions of the present invention are useful as RHMAs, in particular as adhesives for oily steel parts in car assembly plants, and have the advantage that as they are in the form of pellets, they may be shipped and stored in a more convenient manner than conventional liquid or pasty resins.

DETAILED DESCRIPTION OF INVENTION

The composition comprises a cross-linkable resin including at least one copolymer of ethylene with an ethylenically unsaturated monomer, wherein the cross-linkable resin includes an ethylene-acrylic acid (EAA) copolymer, an ethylene methacrylic acid (EMAA) copolymer, and/or an ethylene-acrylic acid-methacrylic acid terpolymer (EAAMAA). The cross-linkable resin is used in a total amount of from about 37 to about 60 percent, preferably from about 40 to about 50 percent by weight, based on the total composition.

The EAA copolymer, EMAA copolymer and/or EAAMAA terpolymer is preferably used in an amount of from about 10 percent to about 40 percent, more preferably from about 15 percent to about 35 percent, most preferably from about 15 percent to about 30 percent, by weight, based on the total composition.

The ethylene-acrylic acid copolymer preferably contains from about 10 to about 30 percent, preferably about 19 to about 25 percent acrylic acid. Preferably the EAA has a melt flow rate (MFR), when measured according to ISO 1133, of more than about 100 g/10 minutes at 190° C. and 2.16 kg. More preferably the EAA has a MFR of from about 300 to about 1300 g/10 minutes at 190° C. and 2.16 kg. Examples of suitable commercially available ethylene-acrylic acid or ethylene-methacrylic acid copolymers are PRIMACOR™ 5980 and 5990 polymers from The Dow Chemical Company, NUCREL™ polymers from Dupont and ESCORT™ polymers from Exxon Mobil Chemical. Particularly preferred is PRIMACOR™ 5990 polymer.

The ethylene-methacrylic acid copolymer preferably contains from about 10 to about 30 percent, preferably about 19 to about 25 percent methacrylic acid. The EMAA preferably has a MFR, when measured according to ISO1133, of from about 300 to about 1300 g/10 minutes at 190° C. and 2.16 kg. An example of a suitable commercially available ethylene-methacrylic acid copolymer is NUCREL™ 2940 polymers from Dupont.

The cross-linkable resin preferably also comprises one or more additional copolymers of ethylene with an ethylenically unsaturated monomer. Suitable additional copolymers include, for example, one or more of ethylene-vinyl acetate copolymers, ethylene-methyl acetate copolymers, ethylene-methylacrylic ester copolymers, ethylene-ethylacrylic ester copolymers, ethylene-butylacrylic ester copolymers. Such polymers when used may be utilized in an amount of up to about 25 percent by weight based on the total composition. Commercially available examples of suitable copolymers include LOTRYL™ from Atofina, ENABLE™ and OPTEMA™ from Exxon Mobil Chemical and Ethyl Acrylate 6182, Ethyl Acrylate 6169, and Ethyl Acrylate 9169 polymers from The Dow Chemical Company. The most preferred additional copolymer is ethylene vinyl acetate.

The ethylene-vinyl acetate (EVA) copolymer is preferably used in an amount of from about 0 to about 25 percent, more preferably from about 5 to about 20 percent, most preferably from about 7 to about 18 percent by weight based on the total composition. The EVA copolymer preferably has a vinyl acetate content of greater than about 30 percent, preferably from about 30 to about 40 percent. The EVA copolymer preferably has a MFR when measured according to ISO 1133 of greater than about 50 g/10 minutes, more preferably from about 200 to about 600 g/minutes at 190° C. and 2.16 kg. Suitable commercially available EVA copolymers include EVATANE™ from Atofina and ESCORENE™ from Exxon Mobil. Particularly preferred are ESCORENE™ polymers UL05540 polymers (MFR of 60 g/10 minutes) and EVATANE™ 33400 polymers (MFR of 350 to 450 g/10 minutes. and a vinyl acetate content of about 30 percent).

The cross-linkable resin preferably also comprises one or more additional terpolymers of ethylene with two ethylenically unsaturated monomers. Suitable additional terpolymers are ethylene-vinyl acetate-maleic anhydride polymers (for example, OREVAC T™ polymers), ethylene-acrylate-maleic anhydride polymers (for example, LOTADER™ AX4720), ethylene-acrylate-glycidyl methacrylate polymers (for example, LOTADER™ AX8900 polymers) and terpolymers containing acrylate and/or methacrylate units and/or methyl acrylate units (for example, ESCOR™ terpolymer from Exxon Mobil Chemical).

The methacrylate- and/or acrylate-ester containing copolymers or terpolymers may be used in an amount of from about 0 to about 30 percent, preferably from about 4 to about 14 percent, more preferably from about 5 to about 13 percent by weight based on the total composition. Such polymers serve to increase the viscosity at low shear rates, and so increase polymer bead stability on application at about 100 to about 120° C. Methacrylate and/or acrylate-containing polymers, for example, an ethylene-acrylic ester-glycidyl methacrylate polymer, preferably contain at least about 25 percent by weight of ethylenically unsaturated monomer units and have an MFR when measured according to ISO 1133 of less than about 10 g/10 minutes at 190° C. and 2.16 m kg. Suitable commercial polymers include LOTADER™ AX 8900 polymers which have a MFR of about 6 g/10 minutes and about 32 percent by weight of ethylenically unsaturated monomer units and AX4720 which has a MFR of 7 g/10 minutes and about 30 percent by weight of ethylenically unsaturated monomer units.

The cross-linkable resin may optionally comprise maleic anhydride grafted elastomers. Suitable commercial examples of maleic anhydride grafted elastomers include LOTADER™ 8200 elastomer, LOTRYL™ 335BA 320 elastomer, LOTRYL™ 28BA 175 elastomer and OREVAC™ terpolymer EVA 9305 elastomer from Ato, EXYELOR™ VA 1801 elastomer (semi-crystalline) and EXXELOR™ VA 1803 elastomer (amorphous) from Exxon, FUSABOND™ N SERIES elastomer: MF416D, MN493D, MN494D and MO525D elastomers and FUSABOND™ C SERIES MC190D, and MC250D elastomers from Dupont. The maleic anhydride grafted elastomer may comprise from about 0 to about 20 percent, preferably from about 10 to about 20 percent of the total composition.

The cross-linkable resin preferably also comprises a rubber, for example, a butadiene homopolymer or a copolymer of butadiene with one or more additional monomers such as divinyl benzene or styrene. Such rubbers are also able to provide additional unsaturation and thereby increase the amount of cross-linking. Rubbers may be employed in an amount of from about 0 percent to about 30 percent, preferably from about 0 percent to about 20 percent, more preferably from about 4 percent to about 10 percent, by weight, based on the total composition. Preferred butadiene rubbers are AMERIPOL™ 4503, and KRATON™ D1161, D4123 and D1184 rubbers.

The adhesion promoter is a material which provides the necessary adhesive properties to the composition before it is cured, i.e., generally at temperatures of up to about 110° C. The adhesion promoter comprises at least one of a tackifier and a plasticizer. The adhesion promoter is generally used in an amount from about 10 percent to about 30 percent, preferably from about 15 percent to about 25 percent by weight based on total composition.

The tackifier is a material capable of imparting tackiness to the composition so that it adheres to the surface to which it is applied, at temperatures of up to about 110° C. Suitable tackifiers are well known in the adhesives industry, and are typically hydrocarbon resins, preferably polymers of cycloaliphatic and alkyl aromatic monomers. Particularly preferred are so-called cycloaliphatic resins for example NECIRES LF 220/100™ or ESCOREZ 2101™ resins. The tackifier is usually used in an amount of from about 0 percent to about 30 percent, preferably from about 7 percent to about 21 percent, more preferably from about 10 percent to about 18 percent, by weight, based on the total composition.

The second optional component of the adhesion promoter is a plasticizer. Generally, the plasticizer is used in conjunction with a tackifier, but for some resin combinations, sufficient low-temperature adhesion may be achieved by the use of a plasticizer alone. The plasticizer may used in an amount of from about 0 percent to about 10 percent, preferably from about 2 percent to about 7 percent, more preferably from about 3 percent to about 6 percent, by weight, based on the total composition. The purpose of the plasticizer is to control the flexibility of the composition, to improve pre-cure adhesion, and to improve the flow properties and wetting of the composition during application.

Any known type of plasticizer suitable for use with ethylene-acrylic acid-type polymers may be employed, for example, phthalates, in particular, alkyl phthalates, for example di-isodecylphthalate (DIDP). Other examples of plasticizers which are suitable are diisoheptyl phthalate, diisononyl phthalate, diisodecyl phthalate, diisoundecyl phthalate, diisotridecylphthalate, and diisononyl adipate and diisodecyl adipate. These plasticizers are sold under the tradename JAYFLEX™ plasticizers from Exxon Mobil. The most preferred plasticizer is JAYFLEX™ diisodecyl phthalate. Other suitable plasticizers and oils will be known to one of skill in the art.

The free radical cross-linking initiator is used preferably in an amount of from about 0.5 percent to about 3 percent, more preferably from about 0.5 percent to about 2 percent, most preferably from about 0.5 percent to about 1.5 percent, by weight, based on the total composition. It functions as a curing agent to cross-link the polymer, by acting as a free radical initiator which promotes cross-linking of the polymer chains. The cross-linking initiator is one which has a 1 hour half-life temperature of from about 110° C. to about 170° C. The 1 hour half-life temperature is the temperature at which the half-life of the initiator (i.e., the time for half of the initiator molecules to decompose) is one hour. Preferably, the cross-linking agent is a peroxide. Examples of suitable peroxides are:

| Peroxide | Trade Name | Temperature for half-life time of (° C.) | |
|---|---|---|---|
| | | 0.1 h | 1 h |
| 2,5 dimethyl-2,5di(tert-butylperoxy)hexyne-3 | TRIGONOX 145 ™ | 182 | 157 |
| di-tert-butyl peroxide | TRIGONOX B ™ | 176 | 154 |
| 2,5 dimethyl-2,5-di(tert-butylperoxy)hexane | TRIGONOX 101 ™ | 171 | 147 |
| tert-butylcumyl peroxide | TRIGONOX T ™ | 169 | 146 |
| di(tert-butylperoxyisopropyl)benzene | PERKADOX 14 ™ | 169 | 146 |
| Dicumylperoxide | PERKADOX BC ™ | 162 | 138 |
| butyl 4,4 bis(tert butyl peroxy)valerate | TRIGONOX 17 ™ | 152 | 130 |
| 1,1 di(tert-butylperoxy)-3,3,5 trimethylcyclohexane | TRIGONOX 29 ™ | 138 | 117 |
| tert-butyl peroxybenzoate | TRIGONOX C ™ | 136 | 110 |

Suitable peroxides can be purchased from Akzo Nobel (TRIGONOX™ or PERKADOX™) or from Atofina (LUPEROX™) as fluids, dissolved in oil, or immobilised on silica as solid powder.

A particularly preferred peroxide is di(tertiarybutylperoxyisopropyl)-benzene (available commercially as PERKADOX™ 14). This peroxide has a 1 hour half-life temperature of 146° C., which makes it suitable for use at curing temperatures of from about 120 to about 200° C.

Optionally, a cure accelerator can be used to increase the viscosity of the RHMA more quickly and thereby limit sagging of the extruded bead. Preferably the cure accelerator is used in an amount of from about 2 to about 10 percent, more preferably from about 4 to about 6 percent by weight based on the total composition. Suitable cure accelerators are diallyl terephthalate, triallylcyanurate, triallylisocyanurate, 1,2-poly butadiene, styrene-butadiene copolymers, divinylbenzene, trimethylolpropane trimethacrylate, polyethylene glycol dimethactylate, ethylene glycol dimethacrylate, pentaerythritol triacrylate, allyl methacrylate, N,N-m-phenylene bismaleimide, toluenebismaleimide-p-quinone dioxime, nitrobenzene, diphenylguanidine. Preferred cure accelerators are triallylcyanurate (for example, TAC from Lehmann & Vos & Co.), 1,2-polybutadiene (for example, RICON™ from Crayvalley), Styrene-Butadiene copolymers (for example, AMERIPOL™ 4503 from AMERIPOL or KRATON™ D1161 from Kraton) and trimethylpropane trimethacrylate (for example, SARTOMER™ 350 from Crayvalley).

The composition of the invention preferably also comprises a filler. The filler serves to decrease the tendency of the molten material to form threads and tails when the molten material is applied to a surface by extrusion. Certain fillers can also increase the viscosity at low shear rates by producing a thixotropic effect. The filler is employed in an amount of from about 10 percent to about 40 percent, more preferably from about 15 percent to about 35 percent, and most preferably from about 25 to about 35 percent, by weight, based on the total composition. The filler is typically an inorganic mineral, such as calcium carbonate, magnesium silicate (talc), calcium silicate (wollastonite). The use of basic materials such as calcium carbonate, which are capable of neutralising any acids which may be present in the resin, is desirable; as such materials act as corrosion inhibitors. Suitable fillers are precipitated calcium carbonate or ground calcium carbonate from Solvay (for example, SOCAL™ 312V), calcium carbonate from Imerys (for example, GAMA SPERSE 80) or OMYA, magnesium silicate from Talc Luzenac or Hipro Trading, and calcium silicate from Nyco. Preferred fillers are talcum HTP1c from HIPRO, calcium carbonate Gama Sperse 80 from Imerys, wollastonite Nygloss 8 from Nyco, or combinations thereof.

Additional conventional additives, such as oils (for example, mineral oils), and colouring agents may also be employed. Such additional components generally constitute no more than about 4 percent by weight, based on the total composition.

The anti-flutter compositions also comprise a foaming agent, which is compatible with the other components and capable of expanding or decomposing on heating, such as when the composition is cured, in order to lower the density of the final cured material. Foaming agents are well known to those of skill in the art. Examples of suitable foaming agents are azo compounds, such as azodicarbonamide, azo-diisobutyro-nitrile, barium azodicarboxylate, nitroso compounds such as N,N'-dimethyl-N,N'-dinitrosoterephthalamide, hydrazides such as benzenesulfonhydrazide, p,p-oxybis (benzenesulfonylhydrazide), carbazides, such as 4,4-oxybenzene sulfonyl semicarbazide, p-toluene sulfonyl semicarbazide, triazines such as trihydrazino triazine, and reactive couples such as mixtures of citric acid and sodium bicarbonate. Such materials may be used singly or in combinations of two or more thereof. Suitable commercially available foaming agents include products sold under the names HYDROCEROL™ (from Boehringer Ingelheim), CELOGEN™ OT, AZ, AZNP, and RA (from Crompton), FICEL™, GENITRON™ and PLANAGEN™ (from Bayer), and SAFOAM™ FP, RPC and RIC FP (from Reed International Corporation). Preferred foaming agents are p,p-oxybis(benzenesulfonylhydrazide) (for example, CELOGEN™ OT) and azodicarbonamide (for example, CELOGEN™ AZ).

The foaming agent preferably provides an expansion of the composition of from about 10 to about 250 percent during curing, more preferably from about 80 percent to about 250 percent, most preferably from about 150 percent to about 250 percent. Typically the foaming agent is used in an amount of from about 0.1 percent to about 4 percent by weight, based on the total composition.

Optionally an anti-flutter composition can additionally comprise a cell regulator. The cell regulator is preferably employed in an amount of from about 1 to about 2 percent by weight of the total composition. The purpose of a cell regulator is to lower the cell size and increase the expansion rate of the composition on curing. The cell regulator is preferably a mixture of barium para tertiary butyl benzoate and lauryl benzenesulfonic acid in oil. This cell regulator is commercially available, for example, as MARK™ K136 from Crompton-Witco vinyl additives.

In a second aspect of the present invention, there is provided a reactive hot melt composition in the form of free-flowing pellets, the composition comprising: a cross-linkable resin including at least one copolymer of ethylene with an ethylenically unsaturated monomer, the resin including one or more of an ethylene-acrylic acid copolymer, an ethylene-methacrylic acid copolymer, and an ethylene-acrylic acid-methacrylic acid terpolymer;
a free radical cross-linking initiator having a 1 hour half-life temperature of from about 110 to about 170° C.; and
a filler.

A composition of this type can be used as a seam-sealer adhesive. In a further aspect of the invention there is provided a method of producing a palletised composition, comprising formulating the above components, and palletizing the resulting composition.

The composition is typically produced in a thermoplastic process, for example, the thermoplastic process found in a compounding unit. Compounding units which may be used are single screw extruders, twin screw extruders, planetary extruders, ring extruders, batch internal mixers, kneaders or mixers such as those sold by Banbury, Farrell, Buss, or Kobe, or similar. In order to produce the compositions of the present invention, the mixing process preferably has a maximum processing temperature of less than about 150° C., more preferably less than about 130° C. and a mixing time of less than about 5 minutes, more preferably less than about 2 minutes. The processing temperature and mixing time are important to ensure that the peroxide and foaming agent have not been activated during the production of the RHMA composition.

Pelletization is generally carried out under-water, preferably using a die face cutter. The pellets of the composition are free flowing at room temperature but to allow transport in large containers, in which temperatures can reach about 40 to about 50° C., a pellet coating may be required. The pellet coating is preferably one or more of a powder coating comprising the filler (d), applied to the composition in an amount of from about 0.2 to about 2.0 percent based on the weight of the composition, and optionally an anti-cluster additive added in the pellet water. Preferably, the pellet water additive is a siloxane oil (for example, those supplied under the trade marks DC290 or DC200/350 from Dow Corning), an oxyalkylate (for example, those supplied under the trade mark EC9092A™ by Nalco Exxon) or a water dispersion of polyethylene (for example, Hordammer PE 03™ from Hoechst). The use of siloxane DC200 in combination with from about 1 to about 2 percent talc results in free-flowing pellets at temperatures of up to about 45° C.

In a fourth aspect of the invention, there is provided a method of adhering a first component to a second component, comprising the steps of melting a composition as described above, contacting the first and second components with the melted composition; and applying heat to cure the composition.

Preferably, the composition is applied to a substrate at temperatures from about 90 to about 120° C. and is cured at a temperature of from about 120 to about 200° C., preferably from about 140 to about 180° C., more preferably from about 150 to about 170° C.

The composition of the present invention is preferably applied to a substrate by means of an applicator which has limited temperature and time exposure to the composition prior to the composition being applied to the substrate. Conventional RHMA equipment can be used if the temperature of application is less than about 150° C., preferably less than about 130° C. and the time at the temperature of application is less than about 10 minutes, preferably less than about 3 minutes. A preferred application system uses a heated pumping screw equipped with an accumulator which feeds the RHMA directly onto the substrate.

SPECIFIC EMBODIMENTS

A number of preferred embodiments of the invention are described in detail in the following Examples.

EXAMPLES 1-10

Anti-Flutter RHMAs

Various reactive hot melt adhesive compositions were prepared by compounding the materials listed in Table 2 or Table 3. In each case, the materials were compounded using a BERSTORFF ZE40™ extruder equipped with a diverter and palletized using a GALA™ under-water Pelletier. In each case the run produced 500 kg of composition.

The raw materials were fed into the extruder using four dosing units and one liquid pump. The liquid pump was used to inject the diisodecylphthalate (DIDP) plasticizer. The raw materials were fed into the extruder either through the main throat of the extruder or via a side-feeding unit. The calcium carbonate filler was either added through the main throat, or via the side feeder.

The following are the conditions used for two alternative production methods:

TABLE 1

|  | Calcium Carbonate via main throat | Calcium Carbonate via side feeder |
|---|---|---|
| Polymer Mixture | main throat | main throat |
| Calcium Carbonate (SOCAL ™) | main throat | side feeder |
| Tackifier (Hydrocarbon Resin) | main throat | main throat |

TABLE 1-continued

|  | Calcium Carbonate via main throat | Calcium Carbonate via side feeder |
|---|---|---|
| Peroxide/Rubber Accelerator/ Foaming Agent/Pigment | main throat | main throat |
| Plasticizer (Diisodecylphthalate (DIDP)) | side feeder | side feeder |
| Barrel Temperatures | 80° C. | 80° C. |
| UWG Die Plate Temp. | 95° C. | 95° C. |
| Adapter and Diverter Temp. | 80° C. | 80° C. |
| Extruder Conditions | 100 rpm, 40 percent Torque | 160 rpm, 43 percent Torque |
| Die pressure | 77 bar | 77 bar |
| Melt temperature | 93-95° C. | 95° C. |
| Output | 50-60 kg/hour | 80 kg/hour |

It was found that, when the side feeder was used to add the calcium carbonate, it was possible to obtain higher throughputs. It was important to keep the feed-zone as cold as possible with cooling water to minute's powder build-up (of pigment and hydrocarbon resin tackifier) in the feed-zone.

For hot melts a minute's viscosity of 3 Pa.s is required in order to allow under water granulation. The compositions of Tables 2 and 3 meet this requirement. Constant run conditions are observed with a melt temperature of less that 100° C. and a residence time of less than one minute. The GALA™ under-water Pelletier is usually used with anti-blocking agents for hot melts. However, the compositions of Tables 2 and 3 do not require anti-blocking agents.

The above method was used to prepare the RHMA formulations shown in Table 2, which shows the amounts of each component as percent by weight, based on the total composition.

TABLE 2

|  | Example No | | | | | | | | | |
|---|---|---|---|---|---|---|---|---|---|---|
|  | 1 | 2 | 3 | 4 | 5 | 6 | 7 | 8 | 9 | 10 |
| Ethylene/acrylic acid copolymer (PRIMACOR 5990i ™) | 29.6 | 13.3 | 15.2 | 16.0 | 13.0 | 13.2 | 18.3 | 14.5 | 33.6 | 24 |
| Ethylene/vinyl acetate copolymer (for example ESCORENE UL 05540 ™ | 9.9 | 13.3 | 12.2 | 10.0 | 13.0 | 13.2 | 8.9 | 13.9 | 0.0 | 9.6 |
| Divinylbenzene/butadiene copolymer rubber (AMERIPOL 4503 ™) | 4.9 | 8.9 | 8.8 | 8.7 | 8.7 | 13.2 | 8.9 | 7.0 | 9.6 | 4.8 |
| Ethylene/acrylic ester/glycidylmethacrylate copolymer (LOTADER AX 8900 ™) | 4.9 | 8.9 | 8.8 | 8.7 | 8.7 | 4.4 | 8.9 | 7.0 | 4.8 | 9.6 |
| Cyclopentadiene resin tackifier | 13.3 | 13.3 | 13.2 | 13.0 | 13.0 | 13.2 | 13.9 | 13.3 | 12.9 | 12.9 |

TABLE 2-continued

| | Example No | | | | | | | | | |
|---|---|---|---|---|---|---|---|---|---|---|
| | 1 | 2 | 3 | 4 | 5 | 6 | 7 | 8 | 9 | 10 |
| (NECIRES LF 220/100 ™) | | | | | | | | | | |
| Calcium carbonate (SOCAL 312 ™) | 30.5 | 33.2 | 32.6 | 32.6 | | 32.6 | 32.9 | 34.8 | 29.8 | |
| Talcum (HIPRO HTP1c ™) | | | | | 32.6 | | | | | 28.8 |
| Di(tertiarybutylperoxyisopropyl)benzene (PERKADOX 14-40 Bpd ™) | 2.0 | 1.8 | 1.8 | 1.7 | 1.7 | 1.8 | 1.8 | 1.9 | 1.9 | 1.9 |
| diphenyl oxide 4,4 disulfonylhydrazide foaming agent (CELOGENE O.T. ™) | 2.0 | 2.0 | 3.1 | 4.1 | 4.1 | 3.1 | 3.1 | 2.1 | 4.6 | 4.6 |
| di-isodecylphthalate (JAYFLEX DIDP) | 2.0 | 4.4 | 4.4 | 4.3 | 4.3 | 4.4 | 3.1 | 4.6 | 1.9 | 1.9 |
| Carbon black (Z 312 ™) | 0.9 | 0.9 | 0.9 | 0.9 | 0.9 | 0.9 | 0.9 | 0.9 | 0.9 | 0.9 |

In all cases, the compositions produced free-flowing, non-sticky granules. A smooth bead with good adhesive properties could be extruded at temperatures of from 100 to 120° C. without activating the peroxide and/or foaming agent. After curing at 180° C., satisfactory expansion, excellent adhesion and softness (measured by means of shore A according to the test ISO868) were obtained. The compositions were therefore suitable for use in anti-flutter applications. The extruded beads of all of the compositions showed no sagging when heated to 180° C. for 30 minutes on a 90° tilted metal sheet.

EXAMPLES 11-18

Seamsealer RHMAs

A reactive hot melt adhesive for use as a seam sealer does not require expansion and therefore does not require a foaming agent. Such adhesives were prepared using the same general method of Examples 1 to 10, using the following components:

EXAMPLES 1 TO 4 AND 11 TO 14

Lap Shear Test

The adhesive properties of the compositions of Examples 1 to 4 and 11 to 14 were tested using DIN 53253 after oven curing at 180° C. for 30 minutes and also after ageing by cataplasma corrosion test for time intervals of 7, 14 and 21 days.

Cataplasma Corrosion Test

Three samples are prepared according to the tensile lap shear strength test. A cotton wool strip of approximately 180 mm by 500 mm is cut and then weighed. It is typically of weight 45 g±5 g. The first sample is placed on the first third of the length of the cotton wool and covered with cotton wool. The second sample is placed on the second third of the length of the cotton wool and is also covered with cotton wool. The third sample is placed on the final third of the length of the cotton wool and covered with cotton wool. The three samples and the cotton wool are then placed in a polyethylene bag. Deionized water with a mass of two times that of the cotton wool is then added to the bag and distributed as evenly as possible over the cotton wool. As

| | Example No | | | | | | | |
|---|---|---|---|---|---|---|---|---|
| | 11 | 12 | 13 | 14 | 15 | 16 | 17 | 18 |
| Ethylene/acrylic acid copolymer (PRIMACOR 5990i ™) | | | 27 | 32.6 | 32.6 | 32.7 | 28 | 28 |
| Ethylene/vinyl acetate copolymer (ESCORENE UL 05540 ™) | 29.7 | 45.5 | 10.2 | 15.8 | 15.8 | 15.8 | 10 | 10 |
| Divinylbenzene/butadiene copolymer rubber (AMERIPOL 4503 ™) | 7.4 | | 8.2 | | | | | |
| Ethylene/acrylic ester/glycidylmethacrylate copolymer (LOTADER AX 8900 ™) | 7.4 | | | | | | 10 | 10 |
| Cyclopentadiene resin tackifier (ESCOREZ 2101 ™) | 14.9 | 15.5 | 15.3 | 13.5 | 13.5 | 13.5 | 14 | 14 |
| Calcium carbonate (SOCAL 312 ™) | 32.6 | 30.8 | 32.7 | 31.5 | | 15.2 | | |
| Talcum (HIPRO HTP1c ™) | | | | | 31.5 | 15.2 | | |
| Wollastonite (NYAD 8) | | | | | | | 30 | |
| Calcium Carbonate (Gama Sperse 80) | | | | | | | | 30 |
| Di(tertiarybutylperoxyisopropyl)benzene (PERKADOX 14-40 Bpd ™) | 2 | 2 | 2 | 2 | 2 | 2 | 2 | 2 |
| di-isodecylphthalate (JAYFLEX DIDP) | 5 | 5.2 | 5 | 3.6 | 3.6 | 3.6 | 5 | 5 |
| Titanium dioxide | 1 | 1 | 1 | 1 | 1 | 1 | 1 | 1 |

The amounts of each component used are percentages by weight, based on the total composition. Examples 11 and 12 contain no EAA and are Comparative Examples.

much air as possible is removed from the bag by manually flattening and smoothing the bag. The opening of the bag is sealed by melting the polyethylene using heating tongs. To ensure that the samples are well sealed within the bag, the first bag is then placed in a second bag and sealed in the same manner. The bag(s) containing the samples are placed in a chamber having a temperature of 70° C.±2° C. for 7 days. The above steps should be repeated with further samples of the same composition and the bags placed in the chamber for 14 days and 21 days. After the ageing of the samples for 7, 14 or 21 days, the samples are removed from the bags and the cotton wool and placed for two hours in a chamber having a temperature of −20° C.±2° C. The samples are then tested using the lap shear test DIN 53253.

Desirably, fresh and aged compositions should show cohesive failure rather than adhesive failure, and have a lap shear strength of at least than 0.5 MPa.

TABLE 4

|  | Lap Shear Strength (MPa) Formulation Nr. | | | |
| --- | --- | --- | --- | --- |
|  | 1 | 2 | 3 | 4 |
| Initial Reference (Galvanized steel) | 0.57 CF | 0.18 CF | 0.21 CF | 0.39 CF |
|  | 0.57 CF | 0.17 CF | 0.91 CF | 0.43 CF |
| 7 days aging method H (Galvanized steel) | 0.7 CF | 0.3 AF | 0.3 AF | 0.5 AF/CF |
| 14 days aging method H (Galvanized steel) | 0.8 CF | 0.4 AF | 0.3 AF | 0.6 AF/CF |
| 21 days aging method H (Galvanized steel) | 0.8 CF | 0.3 AF | 0.45 AF | 0.5 AF/CF |
| Initial Reference Aluminium 6016 | 0.75 CF | 0.21 CF | 0.40 CF | 0.33 CF |
|  | 0.73 CF | 0.2 CF | 0.43 CF | 0.32 CF |
| 7 days aging method H (Aluminium 6016) | 0.85 CF | 0.3 AF | 0.4 AF | 0.7 AF/CF |
| 14 days aging method H (Aluminium 6016) | 1.0 CF | 0.45 CF | 0.4 AF | 0.55 AF/CF |
| 21 days aging method H (Aluminium 6016) | 1.0 CF | 0.4 AF | 0.55 AF | 0.6 AF/CF |

CF = cohesive failure
AF = adhesive failure

The results of the lap shear test are presented in Tables 4 and 5. The results show thatfor anti-flutter reactive hot-melts, Examples 1 and 4, in which the most preferred amount of EAA is present in the composition, show cohesive failure after oven curing at 180° C. and subsequent testing after 21 days cataplasma corrosion testing. Examples 2, 3, and 4 have a lower initial lap shear strength before and after cataplasma testing than Example 1, and also demonstrate adhesive failure in some cases. Examples 2, 3, and 4 are thus less preferred than Example 1. For seam-sealer adhesives, the results show that Example 13 and 14, in which EAA is present in the composition, show cohesive failure after oven curing at 180° C. and subsequent cataplasma corrosion testing for 21 days. Comparative Examples 11 and 12, containing no EAA, have a lower initial lap shear strength before and after cataplasma testing than Example 13 and 14, and also demonstrate adhesive failure in some cases.

TABLE 5

|  | Lap Shear Strength (MPa) Formulation Nr. | | | |
| --- | --- | --- | --- | --- |
|  | 11 | 12 | 13 | 14 |
| Initial Reference (Galvanized steel) | 0.22 AF | 0.19 CF | 0.86 CF | 0.79 CF |
|  | 0.20 AF | 0.18 CF | 0.91 CF | 0.83 CF |
| 7 days aging method H (Galvanized steel) | 0.35 CF/AF | 0.25 AF/CF | 0.96 CF | 0.85 CF |
| 14 days aging method H (Galvanized steel) | 0.40 AF | 0.38 AF/CF | 1.10 CF | 0.96 CF |
| 21 days aging method H (Galvanized steel) | 0.41 AF | 0.35 AF | 1.05 CF | 0.85 CF |

TABLE 5-continued

|  | Lap Shear Strength (MPa) Formulation Nr. | | | |
| --- | --- | --- | --- | --- |
|  | 11 | 12 | 13 | 14 |
| Initial Reference Aluminium 6016 | 0.28 AF | 0.24 CF/AF | 0.78 CF | 0.73 CF |
|  | 0.31 CF/AF | 0.23 CF | 0.84 CF | 0.82 CF |
| 7 days aging method H (Aluminium 6016) | 0.35 AF | 0.32 AF | 0.96 CF | 0.75 CF |
| 14 days aging method H (Aluminium 6016) | 0.38 AF | 0.44 CF | 0.89 CF | 0.85 CF |
| 21 days aging method H (Aluminium 6016) | 0.42 CF/AF | 0.40 AF | 0.92 CF | 0.96 CF |

CF = cohesive failure
AF = adhesive failure

EXAMPLES 1 TO 10

Expansion Rate Test

The expansion rate, density before and after curing and hardness before and after curing of the compositions of Examples 1 to 10 were measured, in order to assess the suitability of the adhesives as anti-flutter sealants. The results are shown in Table 6. The results show that expansion rates of 80 to 200 percent are obtained and that hardness (measured by means of the ISO868 test) decreases on curing.

TABLE 6

| Example | Expansion Rate Percent (Method 1180) | Density Before Curing (Archimede) M/V | Density After curing M/V | Shore A Hardness Before Curing | Shore A Hardness After Curing |
| --- | --- | --- | --- | --- | --- |
| 1 | 191 | 1.253 | 0.422 | 85 | 55 |
| 2 | 80 | 1.149 | 0.622 | 73 | 65 |
| 3 | 114 | 1.078 | 0.492 | 70 | 55 |
| 4 | 150 | 1.119 | 0.435 | 72 | 55 |
| 5 | 134 | 1.193 | 0.501 | 77 | 55 |
| 6 | 153 | 1.242 | 0.483 | 79 | 60 |
| 7 | 154 | 1.261 | 0.486 | 80 | 60 |
| 8 | 157 | 1.2691 | 0.486 | 82 | 63 |
| 9 | 174 | 1.237 | 0.444 | 76 | 55 |
| 10 | 173 | 1.257 | 0.451 | 82 | 58 |

The compositions according to the invention have very desirable pre-cure flow properties, the viscosity of the mixture decreasing markedly as the shear rate is increased. They may be palletized, using conventional palletizing apparatus, in order to provide dry palletized compositions, which are free-flowing at ambient temperatures, and not prone to stickiness or tackiness. They can nevertheless be applied as reactive hot melt compositions at temperatures normally employed in a manufacturing environment, and using either conventional application equipment for example melt pumps, or equipment designed for pellet processing, for example modified extruders.

The compositions of the invention are additionally able to produce a dimensionally stable polymer bead which has good adhesion with the metal substrate. At least the preferred embodiments show no sagging or bead deformation during anticorrosion treatment at 180° C. for 30 minutes, have a lap shear strength of greater than 0.5 MPa DIN 53253 when the adhesive is fresh and also after ageing for 21 days using the cataplasma corrosion test described above, and are capable of inhibiting corrosion. The preferred anti-flutter compositions have an expansion of greater than 150 percent after curing for 30 minutes at 180° C.

Generally the compositions of the invention do not require the use of zinc acrylate adhesion promoter, as is required by various prior art compositions. While the invention has been described with reference to the preferred embodiments, it is to be appreciated that many modifications and variations are possible within the scope of the invention.

What is claimed is:

1. A reactive hot melt composition in the form of free-flowing pellets, the composition comprising:
   a cross-linkable resin comprising, one of an ethylene-acrylic acid copolymer, an ethylene-methacrylic acid copolymer, and an ethylene-acrylic acid-methacrylic acid terpolymer, having a melt flow rate, when measured according to ISO 1113, of more than 100 g/10 minutes at 190° C. and 2.16 kg, said cross-linkable resin further comprising at least one or more additional copolymers of ethylene with an ethylenically unsaturated monomer;
   from about 10 to about 30 percent based on the total weight of the composition, of an adhesion promoter for providing adhesive properties to the composition at temperatures of about 50 to about 100° C., wherein the adhesion promoter comprises at least one of a plasticizer and a tackifier;
   a free radical cross-linking initiator having a 1 hour half-life temperature of from about 110° C. to about 170° C.; and
   a foaming agent;
   wherein the composition is such that it can be melted and extruded on to a substrate at a temperature of from about 90° C. to about 120° C. without curing, and can be cured at a temperature of from about 120° C. to about 200° C.

2. A composition as claimed in claim 1, wherein the said resin constitutes from about 37 to about 60 percent based on the total weight of the composition.

3. A composition as claimed in claim 1, wherein one or more of ethylene-acrylic acid copolymer, ethylene-methacrylic acid copolymer, and ethylene-acrylic acid-methacrylic acid terpolymer is present in an amount of from about 10 to about 40 percent based on the weight of the total composition.

4. A composition as claimed in claim 1, wherein the free radical cross-linking initiator is a peroxide.

5. A composition as claimed in claim 1, wherein the adhesion promoter comprises both a plasticizer and a tackifier.

6. A composition as claimed in claim 1, wherein the resin comprises one or more of a terpolymer containing acrylate and/or methacrylate units, a maleic anhydride grafted elastomer, an ethylene-acrylate-glycidyl methacrylate polymer, an ethylene-acrylate-maleic anhydride polymer, an ethylene-vinyl acetate-maleic anhydride polymer, an ethylene-vinyl acetate copolymer, an ethylene-methylacrylic ester copolymer, an ethylene-ethylacrylic ester copolymer, a ethylene-butylacrylic ester copolymer and a rubber.

7. A composition as claimed in claim 6, wherein one or more of the methacrylate- and acrylate-containing copolymers or terpolymers is present in a total amount of up to about 30 percent, based on the total weight of the composition.

8. A composition as claimed in claim 1, wherein the foaming agent is present in an amount of from about 0.1 percent to about 4 percent by weight, based on the total composition.

9. A composition as claimed in claim 8, wherein the composition expands from about 150 to about 250 percent on curing.

10. A reactive hot melt composition according to claim 1 wherein an ethylenic-acrylic acid copolymer is present in the resin.

11. A reactive hot melt composition according to claim 1 wherein melt flow rate of the ethylene-acrylic acid copolymer, ethylene-methacrylic acid copolymer, or ethylene acrylic acid methacrylic acid terpolymer is 300 to about 1,300.

12. A reactive hot melt composition according to claim 1 wherein the pellets are coated with a powder comprising a filler applied in an amount of from about 0.2 to about 2 percent based on the weight of the composition.

13. A reactive hot melt composition according to claim 10 wherein the additional copolymers of ethylene with an ethylenically unsaturated monomer comprises ethylene vinyl acetate.

14. A reactive hot melt according to claim 8 wherein the additional copolymers of ethylene with an ethylenically unsaturated monomer is present in an amount of up to 25 percent by weight based on the total composition.

15. A composition according to claim 12 wherein the filler is an inorganic mineral.

16. A composition according to claim 15 wherein the filler is calcium carbonate, magnesium silicate or calcium silicate.

17. A composition according to claim 5 wherein the tackifier is present in an amount of about 7 to about 21 percent and the plasticizer is present in an amount of about 2 to about 7 percent by weight based on the total composition.

18. A composition according to claim 17 which cures at a temperature of from about 140° C. to about 200° C.

19. A reactive hot melt composition in the form of free-flowing pellets, the composition comprising:
   a) from about 37 to about 60 percent based on the total weight of the composition of a cross-linkable resin including one or more of an ethylene-acrylic acid copolymer, an ethylene-methacrylic acid copolymer, and an ethylene-acrylic acid-methacrylic acid terpolymer having a melt flow rate, when measured according to ISO 1113 of more than 100 g/10 minutes at 190° C. and 2.16 kg said cross-linkable resin further comprising at least one additional copolymer of ethylene with an ethylenically unsaturated monomer,
   b) from about 10 to about 30 percent based on the total weight of the composition of an adhesion promoter for providing adhesive properties to the composition at temperatures of from about 50° C. to about 100° C., wherein the adhesion promoter comprises at least one of a plasticizer and a tackifier;
   c) from about 0.5 to about 3 percent based on the total weight of the composition of a free radical crosslinking initiator having a 1 hour half-life temperature of from about 110° C. to 170° C.; and
   d) from about 10 to about 40 percent based on the total weight of the composition of a filler;
   e) from about 0.1 to about 4 percent based on the total weight of the composition of a foaming agent;
   wherein the composition is such that it can be melted and extruded on to a substrate at a temperature of from about 90° C. to about 120° C. without curing, and can be cured at a temperature of from about 120° C. to about 200° C.

20. A reactive hot melt composition according to claim 19 wherein an ethylenic acrylic acid is present in the resin.

21. A reactive hot melt composition according to claim 19 wherein melt flow rate of the ethylene-acrylic acid copolymer, ethylene-methacrylic acid copolymer, or ethylene acrylic acid methacrylic acid terpolymer is about 300 to about 1,300.

22. A reactive hot melt composition according to claim 19 wherein the pellets are coated with a powder comprising a filler applied in an amount of from about 0.2 to about 2 percent based on the weight of the composition.

23. A reactive hot melt composition according to claim 20 wherein the additional copolymers of ethylene with an ethylenically unsaturated monomer comprises ethylene vinyl acetate.

24. A reactive hot melt according to claim 23 wherein the additional copolymers of ethylene with an ethylenically unsaturated monomer is present in an amount of up to 25 percent by weight based on the total composition.

25. A composition according to claim 22 wherein the filler is an inorganic mineral.

26. A composition according to claim 25 wherein the filler is calcium carbonate, magnesium silicate or calcium silicate.

27. A method of preparing a pelletized reactive hot melt composition adhesive composition as claimed in claim 1 or claim 19, comprising:
 compounding the components of the composition; and
 pelletizing the resulting composition to produce a dry free flowing material.

28. A method as claimed in claim 27, wherein the components are compounded at a temperature of less than about 150° C.

29. A method of adhering a first component to a second component, comprising the steps of melting a composition as claimed in claim 1 or claim 19 at about 90° C. to about 120° C., contacting the first and second components with the melted composition; and applying heat to cure the composition at a temperature of about 120° C. to about 200° C.

30. A method according to claim 29 wherein the composition is cured at about 140° C. to about 200° C.

31. A method according to claim 27 which further comprises coating the pellets with a powder comprising a filler.

32. A reactive hot melt composition in the form of free-flowing pellets, the composition comprising:
 a cross-linkable resin comprising, one or more of an ethylene-acrylic acid copolymer, an ethylene-methacrylic acid copolymer, and an ethylene-acrylic acid-methacrylic acid terpolymer having a melt flow rate, when measured according to ISO 1113, of more than 100 g/10 minutes at 190° C. and 2.16 kg said cross-linkable resin further comprising at least one or more additional copolymers of ethylene with an ethylenically unsaturated monomer:
 from about 10 to about 30 percent based on the total weight of the composition, of an adhesion promoter for providing adhesive properties to the composition at temperatures of about 50° C. to about 100° C., wherein the adhesion promoter comprises at least one of a plasticizer and a tackifier;
 a free radical crosslinking initiator having a 1 hour half-life temperature of from about 110 to about 170° C.; and
 a filler;
 wherein the composition is such that it can be melted and extruded on to a substrate at a temperature of from about 90° C. to about 120° C. without curing, and can be cured at a temperture of from about 120° C. to about 200° C.

33. A composition according to claim 32 wherein the adhesion promoter comprises both a plasticizer and a tackifier.

34. A composition according to claim 33 wherein the tackifier is present in an amount of about 7 to about 21 percent and the plasticizer is present in an amount of about 2 to about 7 percent by weight based on the total composition.

35. A composition according to claim 34 which cures at a temperature of from about 140° C. to about 200° C.

* * * * *